United States Patent Office 3,402,014
Patented Sept. 17, 1968

3,402,014
PREPARATION OF DYEABLE ACRYLIC
FIBERS AND FILAMENTS
Pompelio A. Ucci, Pensacola, Fla., assignor to Monsanto
Company, St. Louis, Mo., a corporation of Delaware
No Drawing. Continuation-in-part of application Ser. No.
238,781, Nov. 10, 1962. This application June 19, 1967,
Ser. No. 647,241
6 Claims. (Cl. 8—100)

ABSTRACT OF THE DISCLOSURE

Acrylonitrile polymer fibers having improved basic dye acceptance are produced by contacting the acrylonitrile polymer fibers in the gel state with a compound of the general formula $$(R)_x\text{—}X\text{—}(SO_2O\text{—}Y)_y$$

wherein R is hydrogen, hydroxyl or methyl, X is a phenylene radical, a naphthylene radical, or an aliphatic chain of 1 to 4 carbon atoms, Y is hydrogen or an alkali metal and $x$ and $y$ are integers of 1 to 2.

Cross reference to related application

This application is a continuation-in-part of my copending application, Ser. No. 238,781, filed Nov. 19, 1962, now abandoned, entitled, "Method for Improving Dyeing Characteristics."

Field of the invention

This invention relates to the preparation of acrylonitrile polymer fibers having improved basic dye acceptance.

Description of the prior art

Acrylonitrile polymer compositions, particularly fiber-forming compositions, possess a number of characteristics which render them of substantial value for a variety of textile and other purposes. However, it is also well known that such compositions are difficult to dye with basic dyes due to the hydrophobic nature of the acrylonitrile polymer fibers, filaments and other shaped articles. A large number of basic dyes have been developed with good fastness properties. This has rendered of prime importance attempts to improve the basic dyeability of acrylonitrile polymer compositions. Various means have been developed to bring about this improvement. Acrylonitrile monomers have been polymerized with small amounts of a copolymerizable monomer such as an unsaturated sulfonate. Blends of acrylonitrile polymers with polymers having basic dyeability have been attempted. The use of pressure-dyeing techniques at temperatures above the atmospheric boiling point of a polymeric mixture, low temperature dyeing processes and various special dyeing assistants have also partly alleviated this problem but are too limited in scope to be generally useful. A simpler means of increasing basic dye acceptance of acrylonitrile polymers is highly desirable. Such means should enable satisfactory level dyeing to the desired shades using conventional dyes and methods. It should produce a modified fiber that is susceptible to all types of basic dyes without otherwise changing the desired physical characteristics.

Summary of the invention

The present invention provides acyrlonitrile fibers and filaments having improved dyeability with basic dyes and is accomplished by contacting the acrylonitrile fiber while still in the gel state with an additive of the general formula $$(R)_x\text{—}X\text{—}(SO_2O\text{—}Y)_y$$

wherein R is hydrogen, hydroxyl or methyl, X is a phenylene radical, a naphthylene radical or an aliphatic chain of 1 to 4 carbon atoms, Y is hydrogen or an alkali metal, such as sodium or potassium, and $x$ and $y$, being the same or different, are integers of 1 to 2.

The additive of this invention is preferably used in a treatment bath in the form of an aqueous solution containing from about 0.1 to 10 percent of the additive based on the weight of the solution.

It has been found that the additive of this invention may be added to solution spun acrylonitrile polymer fibers and filaments after extrusion, and while the fibers are still in the gel state. The use of the term "gel state" refers to the condition of the fiber after extrusion and during coagulation, washing and orientation of the molecules by stretching and before the fiber is collapsed by drying to its final density and area ratio. During this gel state the fiber has a bulk density of .4 .6 gm./cc., measured on a freeze dried sample. After collapsing, the fiber has a density of from about 1.16 to 1.19 gm./cc. which is roughly equivalent to the density of the polymer prior to extrusion. Since the additives employed in the practice of this invention contain no vinyl or other unsaturation components, they cannot act as copolymerizable monomers. Furthermore, they cannot be satisfactorily applied as an additive after the fiber is collapsed and dried since subsequent scouring and other textile processing operations will remove most of the additive which is deposited on the surface rather than throughout the fiber. But, if the additive is added to the fiber in the gel state, preferably by means of a separate treatment bath, it is occluded into the fiber, forming anionic dye sites in situ, and also keeping other dye sites which may be present in the fiber open and receptive to dyes. Thus, these additives may be referred to as anionic gel state additives. The fiber may then be collapsed, dried and subjected to further processing without the loss of the additive.

The amount of additive which may be employed in the practice of this invention will, of course, vary with the concentration of the additive in solution and with the spinning conditions. In general, the additives are used in the form of an aqueous solution containing from about 0.1 to 10 percent of the additive and preferably 0.5 to 5 percent of the additive, based on the weight of the solution. It has been determined that approximately 50 to 60 percent of this additive will be absorbed by the gel fiber as it passes through the treatment bath. This means that the fiber in its final form after collapsing and any further treatments that may be used will contain from about 0.05 to 5.0 percent of the additive, based on the weight of the fiber.

Description of the preferred embodiments

Suitable additives which may be used in the practice of this invention are those which correspond to the general formula $$(R)_x\text{—}X\text{—}(SO_2O\text{—}Y)_y$$

wherein R is hydrogen, hydroxyl, or methyl, X is a phenylene radical, a naphthylene radical, or an aliphatic chain of 1 to 4 carbon atoms, Y is hydrogen or an alkali metal, such as sodium or potassium, and $x$ and $y$, being the same or different, are integers of 1 to 2. Illustrative of compounds coming within the above formula are 2-naphthol-8-sulfonic acid, 2-naphthol-3, 6-disulfonic acid, methylolsulfonic acid, benzene sulfonic acid, p-tolylsulfonic acid, 1,5-naphthalene disulfonic acid, and the like and alkali metal salts of the above and similar compounds.

The acrylonitrile polymers of this invention include polyacrylonitrile and copolymers, terpolymers, interpolymers and blends of acrylonitrile with other polymerizable mono-olefinic materials, as well as blends of polyacrylonitrile and such polymerized mono-olefinic materials with small amounts of other polymeric materials, such as styrene. In general, a polymer made from a monomer mixture of which acrylonitrile is at least 70 percent by weight of the polymerizable content or a blend of polymers containing at least 70 percent of polymerized acrylonitrile is useful in the practice of the invention. Block and graft copolymers of the same general type are within the purview of the invention.

For example, the polymer may be a copolymer of from 80 to 98 percent acrylonitrile and from 2 to 20 percent of another monomer containing the >C=C< linkage and copolymerizable with acrylonitrile. Suitable mono-olefinic monomers include acrylic, alpha-chloroacrylic and methacrylic acids; the methacrylates such as methyl methacrylate, ethyl methacrylate, butyl methacrylate, octyl methacrylate, methoxymethyl methacrylate, beta-chloroethyl methacrylate, and the corresponding esters of acrylic and alpha-chloroacrylic acids; vinyl chloride, vinyl fluoride, vinyl bromide, vinylidene chloride, 1-chloro-1-bromoethylene; methacrylonitrile; acrylamide and methacrylamide, alpha-chloroacrylmide or monoalkyl substitution products thereof; methyl vinyl ketone; vinyl carboxylates such as vinyl acetate, vinyl chloroacetate, vinyl propionate and N-vinylsuccinimide; methylene malonic esters; itaconic esters; N-vinylcarbazole; vinyl furane; alkyl vinyl ethers; vinyl sulfonic acid; ethylene alpha-beta-dicarboxylic acids or their anhydrides or derivatives such as diethyl fumarate, diethylmaleate, diethyl citraconate, diethyl mesaconate; styrene; vinyl naphthalene; acenaphthalene; vinyl-substituted tertiary heterocyclic amines, such as the vinylpyridines, for example, 2-vinylpyridine, 4-vinylpyridine, 5-methyl-2-vinylpyridine, etc., 1-vinylimidazole and alkyl-substituted 1-vinylimidazoles, such as 2-, 4-, or 5-methyl-1-vinylimidazole, and other >C=C< containing copolymerizable materials.

The polymer may be a ternary interpolymer, for example, products obtained by the interpolymerization of acrylonitrile and two or more of any of the monomers enumerated above. More specifically, a useful ternary polymer comprises acrylonitrile, methacrylonitrile, and 2-vinylpyridine. The ternary polymers may contain, for example, from 80 to 97 percent of acrylonitrile, from 1 to 10 percent of a vinylpyridine or a 1-vinylimidazole, and from 1 to 18 percent of another substance, such as methacrylonitrile or vinyl chloride.

The polymer may also be a blend of from 50 to 98 percent of polyacrylonitrile or of a polymer containing from 80 to 99 percent acrylonitrile and from 1 to 20 percent of at least one other >C=C< containing substance copolymerizable with acrylonitrile, with from 2 to 50 percent of a blending polymer of from 10 to 70 percent of acrylonitrile and from 30 to 90 percent of at least one other >C=C< containing polymerizable monomer. Preferably, when the polymeric material comprises a blend, it will be a blend of (1) a copolymer of 90 to 98 percent of acrylonitrile and from 2 to 10 percent of another mono-olefinic monomer such as vinyl acetate, with (2) a sufficient amount of a copolymer of from 10 to 70 percent of acrylonitrile and from 30 to 90 percent of a vinyl-substituted tertiary heterocyclic amine, such as vinylpyridine, methyl vinylpyridine or 1-vinylimidazole, the two blending polymers being so as to give a dyeable blend having an overall vinyl-substituted tertiary heterocyclic amine content of from 2 to 10 percent based on the weight of the blend. Other blend compositions such as blends of polyvinyl chloride or polyvinylidene chloride with the above described blends, the overall blending composition containing at least 70 percent polymerized acrylonitrile are also within the purview of the invention.

The polymers useful in the practice of the present invention may be prepared by any conventional polymerization procedure, such as mass polymerization methods, solution polymerization methods, or aqueous emulsion procedures. The preferred practice utilizes suspension polymerization wherein the polymer is prepared in finely divided form for immediate use in the fiber fabrication operations. The preferred suspension polymerization may utilize batch procedures wherein monomers are charged with an aqueous medium containing the necessary catalyst and dispersing agents. A more desirable method involves the semi-continuous procedure in which the polymerization reactor containing the aqueous medium is charged with the desired monomers gradually throughout the course of the reaction. Entirely continuous methods involving the gradual addition of monomers and the continuous withdrawal of polymer may also be employed.

The most effective polymers for the preparation of fibers are those of uniform physical and chemical properties and of relatively high molecular weight. The polymers should have molecular weights of at least about 10,000 and preferably between about 25,000 and 150,000.

In preparing the products of the present invention, conventional equipment ordinarily employed in the manufacture of artificial and synthetic fibers and filaments may be used and particularly the equipment which is usually employed in the manufacture of fibers and filaments from acrylonitrile polymers. The present invention is applicable to the usual methods for forming synthetic filaments and fibers, such as dry spinning and wet spinning. Any of the well known prior art solvents, coagulation baths and orientation and washing methods normally used in solution spinning may be used in the practice of the invention. Heat and light stabilizers, delusterants, plasticizers and other like modifying agents may be incorporated with the polymeric compositions disclosed herein without departing from the scope of the invention and without detrimental effects from these gel state additives. Antistatic agents, lubricants and other additives which are either anionic or nonionic may be applied to the fiber in the gel state along with the additives of this invention.

The process and composition of this invention are of distinct advantage over the prior art. There is no need to use inconvenient pressure dyeing conditions to achieve commercially acceptable dyeing properties. The involved step of the incorporation of dye receptive materials in the polymer during its prepartion is eliminated. Basic dye acceptance of the modified acrylic fibers of the invention is at a sufficiently high level to make possible dyeing in deep shades with basic dyes. Color, heat stability, dye penetration and washfastness are also improved. Numerous other advantages of the present invention will be apparent to those skilled in the art.

The following examples are presented as a further disclosure and illustration of the improved products of this invention and is not intended as a limitation thereof. All parts, proportions and percentages are by weight unless otherwise indicated.

EXAMPLE 1

Fiber was prepared from a dope composed of 94 percent acrylonitrile and 6 percent vinyl acetate and a conventional solvent by extrusion into a conventional coagulating bath composed of water and solvent. This fiber was stretched, washed, and before drying, passed through a conventional finish bath composed of the usual lubricating agents, antistatic agents, softening agents, antisoiling agents, etc., and 2 percent of the sodium salt of 1,5-naphthalene disulfonic acid. The fibers were then dried and scoured in a conventional manner and subjected to a conventional dyeing process with the basic dye Sevron Blue 2G (C.I. Basic Blue 22). The amount of Sevron Blue basic dye was known and it was determined that the basic dye uptake was 7.0 percent. This was compared to fibers spun under exactly the same conditions as in this example, but not subjected to the additive of this invention. These fibers were also scoured and dyed in a conventional method and it was determined that these fibers had only 3.5 percent basic dye uptake; therefore, it is seen by the method of this invention that by the use of the additive the basic dye uptake is increased over 70 percent.

EXAMPLE 2

Fiber was prepared from a dope composed of approximately 94 percent acrylonitrile and 6 percent vinyl acetate and a conventional solvent by extrusion into a conventional coagulating bath composed of water and solvent. This fiber was stretched, washed, and before drying, passed through a conventional finish bath composed of the usual lubricating agents, antistatic agents, softening agents, antisoiling agents, etc., and 0.5 percent of the sodium salt of 1,5-naphthalene disulfonic acid. The fibers were then dried and scoured in a conventional manner and subjected to a conventional dyeing process using Sevron Blue 2G dye (C.I. Basic Blue 22). It was determined by knowing the amount of dye present in the dyeing solution that the fibers treated with the additive of this invention had a basic dye uptake of 6.5 percent as compared to a basic dye uptake of 3.5 percent for the control fibers of Example 1.

EXAMPLE 3

The exact procedure as in Example 1 was repeated except the fibers were not scoured prior to dyeing. The basic dye uptake of the fibers which had been subjected to the additive of this invention was 6.8 percent and the basic dye uptake of fibers which had not been treated with the additive of this invention was 3.6 percent; thus, it is seen that no substantive difference is obtained by either scouring the fibers or leaving them unscoured prior to dyeing.

EXAMPLE 4

The exact procedure of Example 2 was repeated except the fibers were not scoured prior to dyeing. It was determined that the fibers which had been treated with the additive of this invention had a basic dye uptake of 6.3 percent as compared to a basic dye uptake of 3.6 percent for the control fibers of Example 3.

EXAMPLE 5

Fiber was prepared from a dope composed of approximately 94 percent acrylonitrile and 6 percent vinyl acetate and a conventional solvent by extrusion into a conventional coagulating bath composed of water and solvent. This fiber was stretched, washed, and before drying, passed through a conventional finish bath containing 0.5 percent of p-tolylsulfonic acid. The fibers were then dried and scoured in a conventional manner and subjected to a conventional dyeing process using Sevron Blue 2G dye (C.I. Basic Blue 22). The fibers were dyed a deep blue and dye penetration of the fibers was uniformly good as compared with a very pale blue color obtained on an identical fiber without the p-tolylsulfonic acid additive.

EXAMPLE 6

Fiber was prepared from a dope composed of approximately 94 percent acrylonitrile and 6 percent vinyl acetate and a conventional solvent by extrusion into a conventional coagulating bath composed of water and solvent. This fiber was stretched, washed, and before drying, passed through a conventional finish bath containing 0.5 percent of benzenesulfonic acid. The fibers were then dried and scoured in a conventional manner and subjected to a conventional dyeing process using Sevron Blue 2G dye (C.I. Basic Blue 22). The fibers were dyed a deep blue and dye penetration of the fibers was uniformly good as compared with a very pale blue color obtained on an identical fiber without the benzenesulfonic acid additive.

EXAMPLE 7

Fiber was prepared from a dope composed of approximately 94 percent acrylonitrile and 6 percent vinyl acetate and a conventional solvent by extrusion into a conventional coagulating bath composed of water and solvent. This fiber was stretched, washed, and before drying, passed through a conventional finish bath containing 0.5 percent of methylolsulfonic acid. The fibers were then dried and scoured in a conventional manner and subjected to a conventional dyeing process using Sevron Blue 2G dye (C.I. Basic Blue 22). The fibers were dyed a deep blue and dye penetration of the fibers was uniformly good as compared with a very pale blue color obtained on an identical fiber without the methylolsulfonic acid additive.

EXAMPLE 8

Fiber was prepared from a dope composed of approximately 94 percent acrylonitrile and 6 percent vinyl acetate and a conventional solvent by extrusion into a conventional coagulating bath composed of water and solvent. This fiber was stretched, washed, and before drying, passed through a conventional finish bath containing 0.5 percent of 2-naphthol-8-sulfonic acid. The fibers were then dried and scoured in a conventional manner and subjected to a conventional dyeing process using Sevron Blue 2G dye (C.I. Basic Blue 22). The fibers were dyed a deep blue and dye penetration of the fibers was uniformly good as compared with a very pale blue color obtained on an identical fiber without the 2-naphthol-8-sulfonic acid additive.

EXAMPLE 9

Fiber was prepared from a dope composed of approximately 94 percent acrylonitrile and 6 percent vinyl acetate and a conventional solvent by extrusion into a conventional coagulating bath composed of water and solvent. This fiber was stretched, washed, and before drying passed through a conventional finish bath containing 0.5 percent of 2-naphthol-3,6-disulfonic acid. The fibers were then dried and scoured in a conventional manner and subjected to a conventional dyeing process using Sevron Blue 2G dye (C.I. Basic Blue 22). The fibers were dyed a deep blue and dye penetration of the fibers was uniformly good as compared with the pale blue color obtained on an identical fiber without the 2-naphthol-3,6-disulfonic acid additive.

It is seen that by the use of the additive of this invention, acrylonitrile polymer fibers produced by any conventional spinning method showed a marked improvement in their basic dye uptake. This is true concerning both the scoured fibers and the unscoured fibers when they have been treated with the special additives of this invention while still in a gel state. This will aid greatly in permitting the use of these acrylonitrile polymer fibers in manufacturing yarns of natural color or yarns which will be dyed with very dark shades of color.

It is understood that changes and variations may be made in the present invention by one skilled in the art without departing from the spirit and scope thereof as defined in the appended claims.

I claim:

1. A composition of matter comprising an acrylonitrile polymer fiber and from about 0.05 to 5.0 percent by weight of an additive of the formula $$OH-X-SO_2OH$$

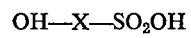

wherein X is an aliphatic chain of 1 to 4 carbon atoms.

2. The composition of claim 1 wherein the additive is present in amounts of from about 0.25 to 2.5 percent by weight.

3. The composition of claim 2 wherein the acrylonitrile polymer fiber consists of a copolymer of at least 80 percent by weight acrylonitrile and up to 20 percent by weight of a copolymerizable mono-olefinic monomer.

4. A process for the preparation of dyeable acrylonitrile polymer fibers comprising contacting the fiber in the gel state with a solution comprising from about 0.1 to 10.0 percent, based on the weight of the solution, of an additive of the formula $$OH-X-SO_2OH$$

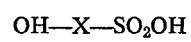

wherein X is an aliphatic chain of 1 to 4 carbon atoms.

5. A process as defined in claim 4 wherein the additive is present in the solution in amounts of from about 0.5 to 5.0 percent, based on the weight of the solution.

6. A process as defined in claim 4 wherein the acrylonitrile polymer fiber consists of a copolymer of at least 80 percent by weight acrylonitrile and up to 20 percent by weight of a copolymerizable mono-olefinic monomer.

References Cited

UNITED STATES PATENTS

| | | | |
|---|---|---|---|
| 2,431,956 | 12/1947 | Moody | 8—46 |
| 2,819,943 | 1/1958 | Rhyner et al. | 8—55 |
| 3,122,517 | 2/1964 | Kruckenberg et al. | 8—55 |
| 3,178,253 | 4/1965 | Hirshfeld | 8—55 |
| 3,300,272 | 1/1967 | Robinson | 8—100 |

FOREIGN PATENTS

| | | |
|---|---|---|
| 571,376 | 2/1959 | Canada. |
| 1,374,864 | 8/1964 | France. |

NORMAN G. TORCHIN, *Primary Examiner.*

THOMAS J. HERBERT, JR., *Assistant Examiner.*